US011189173B1

(12) United States Patent
Esselink et al.

(10) Patent No.: US 11,189,173 B1
(45) Date of Patent: Nov. 30, 2021

(54) SYSTEMS AND METHODS FOR PROVIDING PROXIMITY ALERTS BETWEEN VEHICLES AND PERSONAL TRANSPORTATION DEVICES

(71) Applicant: Ford Global Technologies, LLC, Dearborn, MI (US)

(72) Inventors: Chad Esselink, Canton, MI (US); Shabnam Hosseini, Dearborn, MI (US); Wojciek Szumowski, Dearborn, MI (US); Chiamin Lin, Dearborn, MI (US); Eric Marsman, Canton, MI (US); Peter Treman, Livonia, MI (US); Rhett Tracy Schaefer, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/146,929

(22) Filed: Jan. 12, 2021

(51) Int. Cl.
*B60Q 1/26* (2006.01)
*G08G 1/16* (2006.01)

(52) U.S. Cl.
CPC .................................... *G08G 1/166* (2013.01)

(58) Field of Classification Search
CPC ............. G08G 1/096716; G08G 1/205; G08G 1/0969; G08B 21/20; B60Q 1/525; G01S 13/931; G01S 19/42
See application file for complete search history.

(56) References Cited

U.S. PATENT DOCUMENTS 7,079,024 B2 * 7/2006 Alarcon ................. G08B 5/006 340/539.11
7,586,405 B1 * 9/2009 Brandenburg ........... B60Q 1/18 250/336.1
9,475,461 B1 * 10/2016 Pudiyathanda .. G08G 1/096791
10,621,871 B2 4/2020 Crasso et al.
(Continued)

OTHER PUBLICATIONS

John Macarthur, "If Bikes Could Talk: Would Connected Vehicle Tech Get More People Riding?", Portland State University, Transportation Research and Education Center, Sep. 26, 2019, 4 pages.
(Continued)

*Primary Examiner* — Munear T Akki
(74) *Attorney, Agent, or Firm* — Brandon Hicks; Eversheds Sutherland (US) LLP

(57) ABSTRACT

Example embodiments described in this disclosure are generally directed to systems and methods for preventing vehicle mishaps. In an example method, a vehicle receives an alert signal from a personal transportation device. A driver of the vehicle may be made aware of the alert by a sound that is produced through a speaker system of the vehicle (for example, a ringing sound produced by a bicycle bell or a beep of a motorcycle horn). In some cases, an intensity and/or a directionality of the sound produced through the speaker system may provide location and/or distance information of the personal transportation device with respect to the vehicle. The vehicle may transmit an acknowledge signal to the personal transportation device. A rider of the personal transportation device may be informed
(Continued)

of the acknowledgement via an audio announcement through a speaker mounted on the personal transportation device.

8 Claims, 5 Drawing Sheets

(56) References Cited

U.S. PATENT DOCUMENTS

| | | | | |
|---|---|---|---|---|
| 2007/0132608 | A1* | 6/2007 | Votaw | G08G 1/0965<br>340/903 |
| 2013/0127638 | A1* | 5/2013 | Harrison | G08G 1/166<br>340/903 |
| 2014/0297173 | A1* | 10/2014 | Li | G08G 1/166<br>701/301 |
| 2015/0228066 | A1* | 8/2015 | Farb | H04N 5/2251<br>348/148 |
| 2017/0132922 | A1* | 5/2017 | Gupta | G06F 3/0482 |
| 2018/0005528 | A1* | 1/2018 | Loeillet | G08G 1/165 |
| 2018/0156624 | A1 | 6/2018 | Bai et al. | |
| 2018/0275650 | A1* | 9/2018 | Nelson | G08G 1/166 |
| 2020/0193829 | A1* | 6/2020 | Cheng | H04W 4/90 |

OTHER PUBLICATIONS

Greg Tasker, "This Royal Oak company is creating bicycle-to-vehicle communication tech to prevent cyclist deaths", DRIVEN, Detroit: The Region Leading the World in Mobility, Nov. 7, 2019, 5 pages.

Ben Coxworth, "Backtracker radar system warns cyclists of approaching cars", New Atlas, Jul. 4, 2014, 9 pages.

* cited by examiner

SYSTEMS AND METHODS FOR PROVIDING PROXIMITY ALERTS BETWEEN VEHICLES AND PERSONAL TRANSPORTATION DEVICES

BACKGROUND

Riders of two-wheeled vehicles, particularly bicycle enthusiasts, face a number of hazards when sharing a road with other road users such as drivers of cars, trucks, vans, and buses. Some drivers tend to be courteous towards bicyclists, while some other drivers tend to view bicyclists as nuisances. A courteous driver may perform actions such as switching to a lane away from a bicycle lane, slowing down so as to prevent a draft from adversely affecting a bicyclist, and/or producing a friendly beep from a horn to alert the bicyclist. On the other hand, an aggressive driver may pass very close to the bicyclist thereby endangering the bicyclist, and/or may produce a prolonged blast from his/her horn to show displeasure. In some countries, operating of a horn is generally deemed to be an unfriendly act, regardless of the intent. It is therefore desirable to offer a solution that promotes friendly interaction between a driver of a vehicle and a rider of a two-wheeled vehicle such as bicycle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
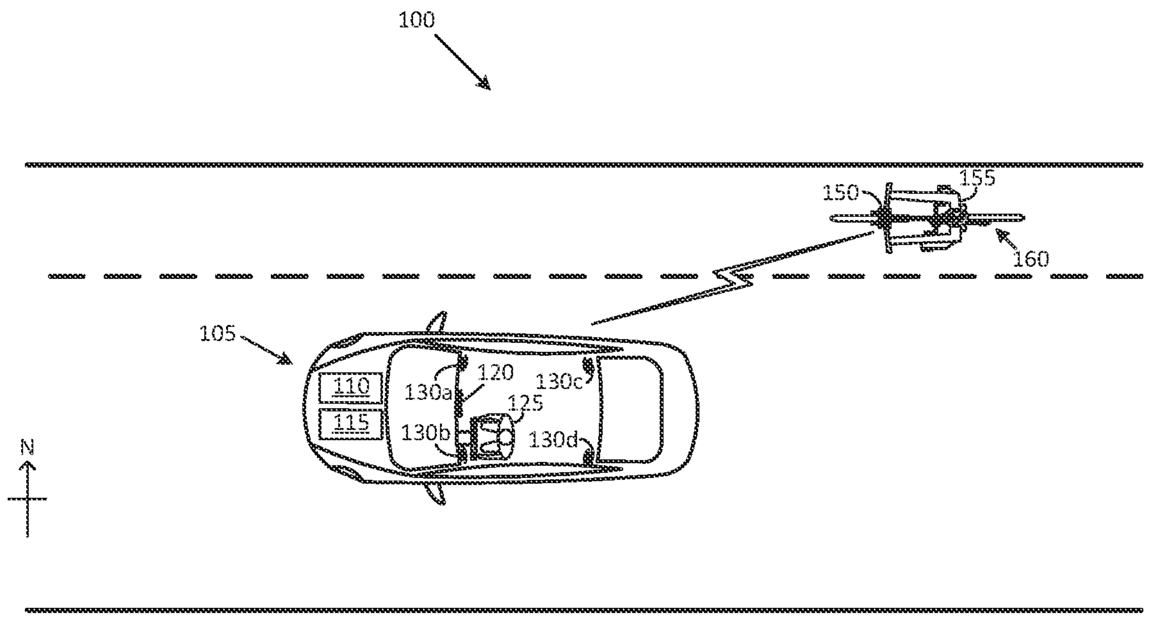
FIG. 1 illustrates a first example scenario where a proximity alerting system may be operated in accordance with an embodiment of the disclosure.

In terms of a general overview, certain embodiments described in this disclosure are generally directed to systems and methods to prevent mishaps involving vehicles and personal transportation devices. In an example method, a transceiver in a vehicle receives an alert signal transmitted by a transceiver provided on a personal transportation device (a bicycle, a motorcycle, a moped, a scooter, etc.) that is close to the vehicle. A driver of the vehicle may be made aware of the alert by a sound that is produced through a speaker system of the vehicle (for example, a ringing sound produced by a bicycle bell or a beep of a motorcycle horn). In some cases, an intensity and/or a directionality of the sound produced through the speaker system of the vehicle may provide location and/or distance information of the personal transportation device with respect to the vehicle. The transceiver in the vehicle may transmit an acknowledgement signal to the personal transportation device to acknowledge receipt of the alert signal. A rider of the personal transportation device may be informed of the acknowledgement from the vehicle via an audio announcement produced through a speaker mounted on the personal transportation device.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used herein encompasses various types of vehicles having more than two wheels such as, for example, cars, vans, sports utility vehicles, trucks, electric vehicles, gasoline vehicles, hybrid vehicles, three-wheeled vehicles, driver-operated vehicles, and autonomous vehicles. The word "personal transportation device" as used herein must be interpreted as being synonymous with various types of vehicles other than conventional four-wheeled vehicles (such as, for example, a car), as well as conventional vehicles having more than four wheel (such as, for example, a flatbed truck). A few examples of a personal transportation device in accordance with the disclosure, can include various types of vehicles having two wheels such as, for example, a pedal-operated bicycle, a motor-operated bicycle, a motor-assisted bicycle, a moped, a motorcycle, and a scooter. The word "scooter" as used herein encompasses personal transportation devices that are driven on roadways, personal transportation devices that can be operated on pavements and sidewalks (such as, for example, foot-operated scooters, motor-driven scooters, and motor-assisted scooters), three-wheelers used by handicapped persons, three-wheelers used for recreational purposes, and three-wheelers used in utility applications. The phrase "alert signal," which may be considered as functionally equivalent to ringing a bell on a bicycle in order to warn a person, can be implemented in a variety of ways in accordance with the disclosure. A few example implementations of an alert signal can include a text message, a trigger signal, a trigger tone, and as digital bits. The digital bits may be used to transport various types of content such as, for example, signals, triggers, data, messages, instructions, and/or commands. The word "computer" as used in this disclosure can refer to any of various types of computing devices that may be located in various places for carrying out various kinds of functions. The various types of computing devices can include, for example, a device that is dedicated to executing functions in accordance with disclosure, a tablet computer, a phablet (phone plus tablet computer), a cloud computer, a wearable device (a smartwatch, for example), a smart wearable clothing item, and/or a smartphone. Words such as "wireless" or "wirelessly" as used herein are not intended to preclude other forms of communication such as optical communications and wired communications. The examples provided herein encompass such alternative communication technologies. The word "collision" as used herein encompasses two objects that make contact with each other accidentally or non-accidentally. As such the word should be understood to encompass "accidents." The phrase "vehicular mishap" as used herein encompasses any form of undesirable contact between a vehicle and any object (another vehicle, a bicycle, a motorcycle, etc.). It should also be understood that the word "example" as used herein is intended to be non-exclusionary and non-limiting in nature. The word indicates one among several examples, and no undue emphasis or preference is being directed to the particular example being described. The phrase "example implementation" as used herein should be interpreted as a shortened version of the phrase "example implementation in accordance with the disclosure."

It should be further understood that the example embodiments disclosed herein with reference to a "bicycle 160" are also applicable to various other types of personal transportation devices (motorcycles, mopeds, scooters, etc.). Persons of ordinary skill in the art will recognize that the concepts provided herein with respect to personal transportation devices may be equally applicable in some cases to vehicles having more than two wheels, including various types of vehicles (having four or more wheels). For example, an alert signal may be transmitted from a car to a bus, followed by additional operations described herein in accordance with the disclosure.

FIG. 1 illustrates a first example scenario where a proximity alerting system 100 may be operated in accordance with an embodiment of the disclosure. The proximity alerting system 100 can include one or more devices provided in an example vehicle 105 and in an example bicycle 160, in order to prevent a vehicular mishap between the vehicle 105 and the bicycle 160, and/or in order to avoid an undesirable interaction between a driver 125 of the vehicle 105 and a rider 155 of the bicycle 160. The vehicular mishap can be, for example, a collision between the vehicle 105 and the bicycle 160. The undesirable interaction can be, for example, a verbal altercation and/or a physical altercation between the driver 125 of the vehicle 105 and the rider 155 of the bicycle 160. In some implementations, the bicycle 160 may be a part of a fleet of bicycles that are communicatively coupled to each other (via a network) and to other objects such as a server computer or a cloud computer. In other implementations, the bicycle 160 may be replaced by other objects such as a motorcycle, a moped, or a scooter.

An example device provided in the vehicle 105 is a proximity alerting apparatus 115 that may be communicatively coupled to various other devices in the vehicle 105, such as, for example, a vehicle controller 110 and an infotainment system 120. The proximity alerting apparatus 115 can also include a wireless transceiver configured to wirelessly communicate with various devices located outside the vehicle 105 such as, for example, another wireless transceiver that is a part of a proximity alerting apparatus 150 provided on the bicycle 160.

Various communication technologies and communication protocols may be employed for carrying out the wireless communications between the wireless transceiver of the proximity alerting apparatus 115 and the wireless transceiver of the proximity alerting apparatus 150. In an example implementation in accordance with disclosure, the wireless communications may be carried out by using one or more device-to-device communications technologies such as, for example, vehicle-to-everything (V2X), cellular V2X, dedicated short-range communications (DSRC), Wi-fi, Bluetooth®, Ultra-Wideband (UWB), Zigbee®, and/or Li-Fi (light-based communication).

Employing device-to-device communications technologies minimizes signal transmission latencies in comparison to communications technologies that involve propagation of signals through a communications network where signal transmission delays can be introduced. Minimized signal latencies allows the proximity alerting apparatus 115 of the vehicle 105 and/or the proximity alerting apparatus 150 of the bicycle 160 to perform certain operations very quickly. An example operation may be directed at avoiding a collision between the vehicle 105 and the bicycle 160 when a separation distance between the vehicle 105 and the bicycle 160 is less than a threshold distance (two feet to six feet, for example).

However, in some implementations in accordance with disclosure, where signal latencies are not a significant concern, wireless communications between the wireless transceiver of the proximity alerting apparatus 115 and the wireless transceiver of the proximity alerting apparatus 150 may be carried out by propagating signals though a communications network. The communications network may include any one or combination of networks, such as, for example, a local area network (LAN), a wide area network (WAN), a telephone network, a cellular network, a cable network, a wireless network, and/or private/public networks such as the Internet.

The vehicle controller 110 may control various operations of the vehicle 105 (fuel injection, speed control, braking, cruise control, etc.) either directly (when the vehicle 105 is an autonomous vehicle) or indirectly (by providing assistance to a driver of the vehicle 105 when the vehicle 105 is a driver-operated vehicle). In accordance with an embodiment of the disclosure, the proximity alerting apparatus 115 of the vehicle 105 may convey information (commands, instructions, data, signals etc.) to the vehicle controller 110 for the vehicle controller 110 to perform various operation. In an example scenario, the proximity alerting apparatus 115 of the vehicle 105 may receive an alert signal from the proximity alerting apparatus 150 of the bicycle 160 and act upon the alert signal by instructing the vehicle controller 110 to slow down the vehicle 105 and/or to switch lanes.

In another example scenario, the proximity alerting apparatus 115 of the vehicle 105 may convey information (commands, instructions, data, signals etc.) to other components in vehicle, such as, for example, the infotainment system 120. In an example implementation, the proximity alerting apparatus 115 may communicate with the infotainment system 120 (either directly or via the vehicle controller 110) to produce various types of sounds through an audio system. The audio system may include a single speaker (or beeper) or may include multiple speakers (speakers 130*a-d*, for example).

In an example implementation, the proximity alerting apparatus 115 may receive a first type of alert signal from the proximity alerting apparatus 150 of the bicycle 160. The first type of alert signal may include an instruction to the proximity alerting apparatus 115 of the vehicle 105 to produce through the speaker(s) of the infotainment system 120, a sound that indicates a nature of the personal transportation device.

In the example scenario illustrated in FIG. 1, the sound may be a ringing sound of a bicycle bell to indicate that the personal transportation device is the bicycle 160. In another scenario, where a motorcycle is present in place of the bicycle 160, a proximity alerting apparatus of the motorcycle may propagate to the proximity alerting apparatus 115 of the vehicle 105, a second type of alert signal that includes an instruction to the proximity alerting apparatus 115 to produce through the speaker(s) of the infotainment system 120, an audible alert that is tailored to indicate a presence of the motorcycle (such as, for example, a beep produced by a motorcycle horn). Other types of alert signals may be tailored and employed to indicate other types of vehicles such as, for example, a scooter or a moped. The uniqueness of the sound produced by the speaker(s) can provide to the driver 125 an indication as to what type of vehicle is near the vehicle 105.

In another example implementation, a sensor system of the vehicle 105 may determine a location of the bicycle 160. This operation may be performed, for example, by a camera that captures one or more images of the bicycle 160 and/or a radar sensor that generates signals related to location/distance. The image(s) captured by the camera and/or the signals generated by the radar sensor may be evaluated by the proximity alerting apparatus 115 of the vehicle 105 to determine a location of the bicycle 160 and/or a separation distance of the bicycle 160 with respect to the vehicle 105. The proximity alerting apparatus 115 may communicate with the infotainment system 120 to provide the location/distance information to the driver 125 of the vehicle 105.

When multiple speakers are used (speakers 130*a-d*, for example) the sound produced through the speakers may be arranged to convey a directional characteristic and/or an intensity characteristic. The driver 125 may interpret the directional characteristic, which may be achieved through a surround sound effect, for example, to identify a location of the bicycle 160 with respect to the vehicle 105. In the example scenario illustrated in FIG. 1, the bicycle 160 is behind and to the right of the vehicle 105. In other scenarios, the bicycle 160 may for example, be behind and to the left of the vehicle 105, in front and to the right of the vehicle 105, in front and to the left of the vehicle 105, beside the vehicle 105 on the left, beside the vehicle 105 on the right, and so on.

The driver 125 may interpret the intensity characteristic of the sound produced through the spear(s) to identify a location of the bicycle 160 with respect to the vehicle 105. A first sound having a high intensity can indicate a smaller separation distance between the vehicle 105 and the bicycle 160 in comparison to a second sound having a lower intensity which indicates a greater separation distance between the vehicle 105 and the bicycle 160.

In another example implementation, the proximity alerting apparatus 115 of the vehicle 105 may receive from the proximity alerting apparatus 150 of the bicycle 160, an alert signal in a message format used by bicyclists when issuing warnings, such as, for example, "coming up on your right!" or "to your right!" The proximity alerting apparatus 115 of the vehicle 105 may instruct the infotainment system 120 to issue an audible alert that includes the received message. In some cases, the audible alert may be tailored to provide location and/or distance information to the driver 125, such as would be perceived by an individual walking on a path, when a bicyclist calls out a warning to the individual.

In another example implementation, the proximity alerting apparatus 115 may communicate with the infotainment system 120 to display a visual alert such as, for example, in the form of a graphic and/or text on a display screen of the infotainment system 120. An example graphic may be an image having icons of the vehicle 105 and the bicycle 160. The driver 125 can view the graphic and make various determinations such as, for example, a location of the bicycle 160 and/or a separation distance between the bicycle 160 and the vehicle 105.

In an example method of operation in accordance with the disclosure, the wireless transceiver of the proximity alerting apparatus 115 in the vehicle 105 receives an alert signal transmitted by the wireless transceiver of the proximity alerting apparatus 150 of the bicycle 160. In one implementation, the alert signal is automatically transmitted when a sensor in the vehicle 105 senses that the bicycle 160 is located at a spot having a separation distance from the vehicle 105 that is less than a threshold separation distance. The threshold separation distance may be pre-programmed into the proximity alerting apparatus 115. In another implementation, the alert signal is initiated by the rider 155, for example, via a voice command issued by the rider 155 to a voice recognition system provided in the proximity alerting apparatus 115. The threshold separation distance in this case, may be determined by the rider 155 based on personal preference.

The proximity alerting apparatus 115 acknowledges receipt of the alert signal by transmitting an acknowledgement signal to the proximity alerting apparatus 150 of the bicycle 160. The acknowledgement signal can be transmitted in various ways. In an example implementation, the display screen of the infotainment system 120 can be a touchscreen. The driver 125 may touch an icon (labeled "Acknowledge", for example) to transmit an acknowledgement signal to the proximity alerting apparatus 150 of the bicycle 160. In another example implementation, where the vehicle 105 is an autonomous vehicle, the proximity alerting apparatus 115 may automatically transmit an acknowledgement signal to the proximity alerting apparatus 150 of the bicycle 160 without human involvement.

In an example embodiment, the proximity alerting apparatus 150 of the bicycle 160 can be a personal communication device, such as a smartphone, for example, that is carried by the rider 155. In another example embodiment, the proximity alerting apparatus 150 of the bicycle 160 can be a dedicated unit that can be mounted upon the handlebar of the bicycle 160, for example. An audio announcement and/or beeping sound may be produced by a speaker/beeper of the proximity alerting apparatus 150 upon receiving the acknowledgement signal from the proximity alerting apparatus 115. The audio announcement, which can be a voice message, (and/or the beep) informs the rider 155 that his/her presence has been recognized and noted by the vehicle 105.

Figure 2:
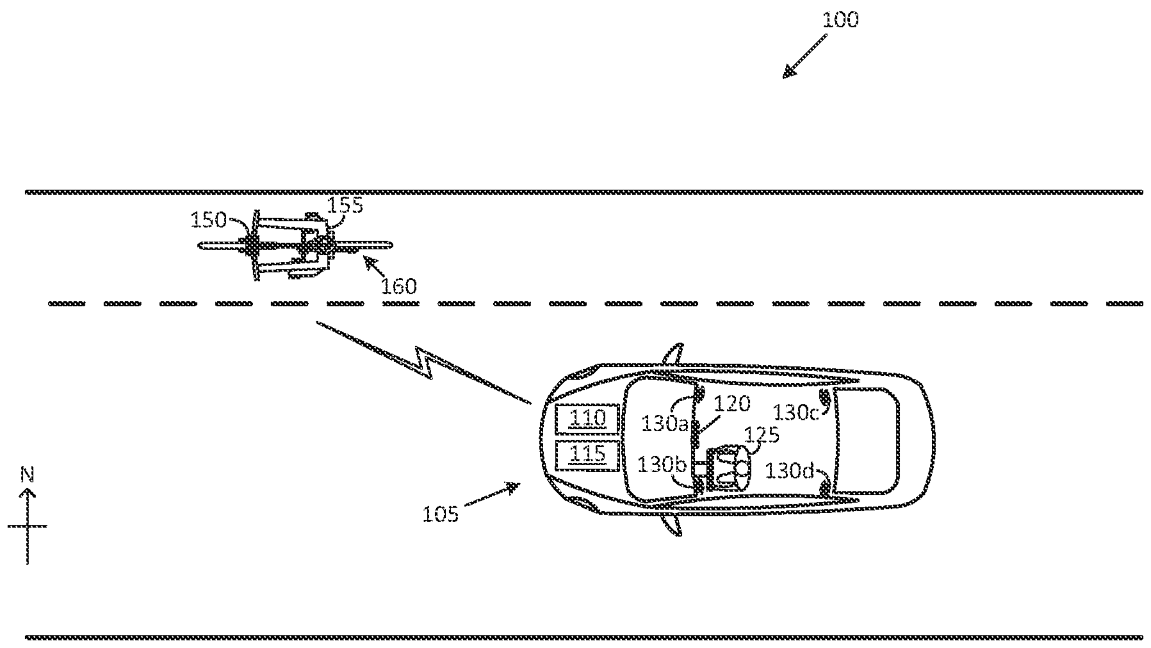
FIG. 2 illustrates a second example scenario where a proximity alerting system may be operated in accordance with an embodiment of the disclosure.

FIG. 2 illustrates a second example scenario where a proximity alerting system 100 may be operated in accordance with an embodiment of the disclosure. In this second example scenario, the bicycle 160 is located in front of the vehicle 105 in a bicycle lane on the right side of the vehicle 105. The rider 155 of the bicycle 160 may be unaware of the vehicle 105. The driver 125 of the vehicle 105 may decide to alert the rider 155 by transmitting an alert signal to the proximity alerting apparatus 150 of the bicycle 160. The driver 125 may decide to transmit the alert signal upon deciding that a separation distance between the vehicle 105 and the bicycle 160 is less than a threshold distance. The threshold distance may be determined on the basis of a personal preference of the driver 125. The driver 125 may initiate transmission of the alert signal by touching an icon upon a graphic displayed on the display screen of the infotainment system 120 or by depressing a button provided for this purpose on the proximity alerting apparatus 150.

In another implementation, the alert signal may be automatically transmitted by the proximity alerting apparatus 115 of the vehicle 105 based on receiving a sensor signal from an object sensor mounted on the vehicle 105. The sensor signal may be produced by the object sensor when a separation distance between the vehicle 105 and the bicycle 160 is less than a preset threshold distance. The vehicle 105 can be a driver-operated vehicle or an autonomous vehicle in this implementation.

The proximity alerting apparatus 150 of the bicycle 160 may act upon the alert signal by producing an audio announcement and/or a beeping sound to alert the rider 155. In an example implementation, the beeping sound can resemble a friendly tap of a vehicle horn or a pleasant musical jingle.

The proximity alerting apparatus 150 of the bicycle 160 may also transmit to the vehicle 105, an acknowledge signal to acknowledge receipt of the alert signal. The transmitting may be carried out by the proximity alerting apparatus 150 without requiring any action to be taken on the part of the rider 155. Such a configuration enhances safety because the rider 155 does not have to turn his/her head to notice the presence of the vehicle 105, and the driver 125 of the vehicle 105 does not have to operate his horn thereby startling the rider 155.

The proximity alerting apparatus 115 of the vehicle 105 may inform the driver 125 that the bicycle 160 has acknowledged the alert signal. The informing may be carried out by producing a sound or a voice message through a speaker in the vehicle 105.

Figure 3:
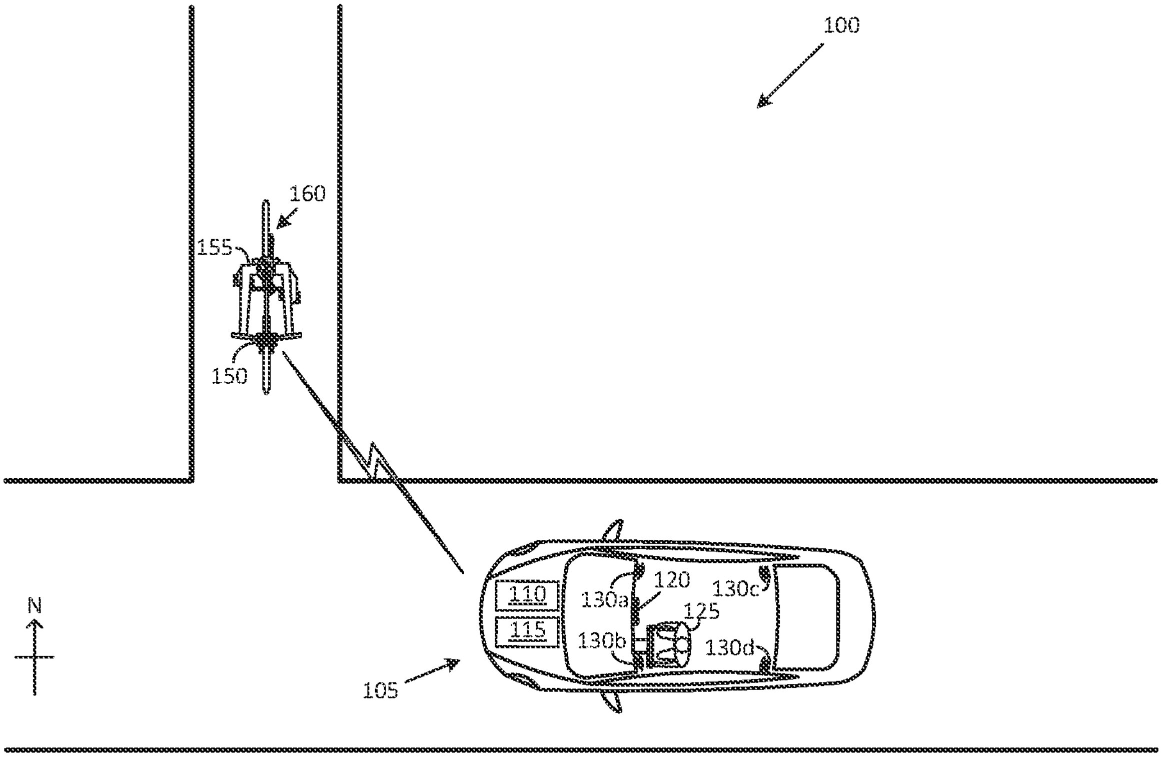
FIG. 3 illustrates a third example scenario where a proximity alerting system may be operated in accordance with an embodiment of the disclosure.

FIG. 3 illustrates a third example scenario where a proximity alerting system 100 may be operated in accordance with an embodiment of the disclosure. In this example scenario, the bicycle 160 is headed south towards an intersection and the vehicle 105 is headed west towards the intersection, as well. The bicycle 160 and the vehicle 105 may, or may not, be in a line of sight of each other. Either the rider 155, the proximity alerting apparatus 150 of the bicycle 160, the driver 125, or the proximity alerting apparatus 115 of the vehicle 105, can transmit an alert signal in the manner described above, followed by interactions such as those described above.

Figure 4:
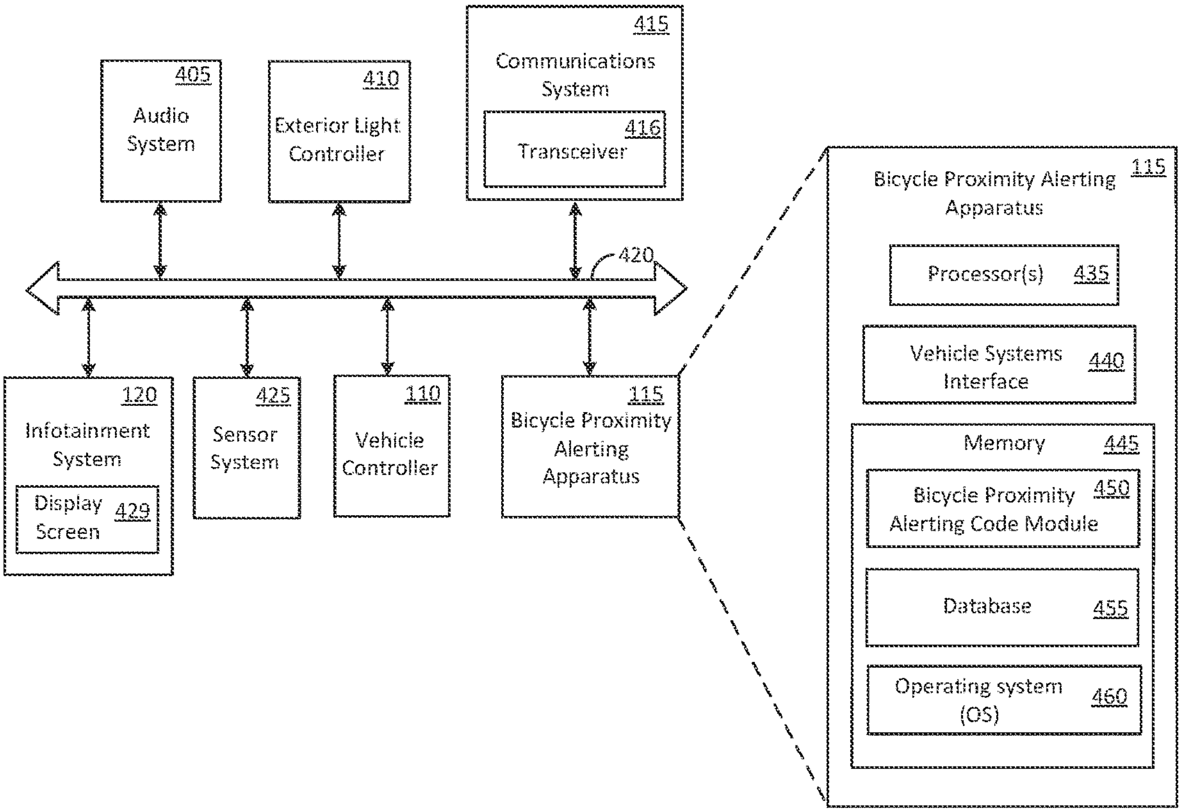
FIG. 4 shows some example components that may be included in a vehicle for implementing a proximity alerting system in accordance with an embodiment of the disclosure.

FIG. 4 shows a few example components that may be included in the vehicle 105 for implementing the proximity alerting system 100 in accordance with an embodiment of the disclosure. The example components can include the proximity alerting apparatus 115, the vehicle controller 110, the infotainment system 120, a sensor system 425, an audio system 405, an exterior light controller 410, and a communications system 415. Though shown as separate functional blocks, it must be understood that in some implementations, two or more functionalities may be combined and performed by a single physical unit. Thus, for example, in an example implementation, the functionality of the exterior light controller 410 may be integrated into a physical unit that houses the vehicle controller 110 as well.

The various components are communicatively coupled to each other via one or more buses such as an example bus 420. The bus 420 may be implemented using various wired and/or wireless technologies. For example, the bus 420 can be a vehicle bus that uses a controller area network (CAN) bus protocol, a Media Oriented Systems Transport (MOST) bus protocol, and/or a CAN flexible data (CAN-FD) bus protocol. Some or all portions of the bus 420 may also be implemented using wireless technologies such as Bluetooth®, Ultra-Wideband, Wi-Fi, Zigbee®, or near-field-communications (NFC).

The audio system 405 can include one or more speakers such as, for example, the speakers 130*a-d* shown in FIG. 1. The speakers may be coupled to the infotainment system 120 via wires that can be a part of the bus 420. The infotainment system 120 may receive commands from the proximity alerting apparatus 115 and produce via the audio system 405, various sounds that may be directed at the driver 125 of the vehicle 105 in accordance with the disclosure. In an example implementation, the audio system 405 may be used, for example, to issue a first voice message informing the driver 125 of the receipt of an alert signal from the bicycle 160, and another voice message instructing the driver 125 to respond to the alert signal.

The exterior light controller 410 may respond to commands received from the proximity alerting apparatus 115, by transmitting signals to operate various exterior lights of the vehicle 105 such as head lights, tail lights, hazard lights, and turn lights. The proximity alerting apparatus 115 may communicate with the exterior light controller 410 via the bus 420 to provide instructions for the exterior light controller 410 to perform certain functions in accordance with the disclosure (such as, for example, to flash an acknowledgement signal to the rider 155 of the bicycle 160 upon receiving an alert signal from the proximity alerting apparatus 150 of the bicycle 160).

The communications system 415 may include a wireless transceiver 416 that allows the proximity alerting apparatus 115 to transmit/receive information to/from the proximity alerting apparatus 150 of the bicycle 160 (such as, for example, an alert signal and an acknowledgement signal). In an example implementation, the wireless transceiver 416 may allow the proximity alerting apparatus 115 of the vehicle 105 to communicate with a wireless transceiver of the proximity alerting apparatus 150 of the bicycle 160 by using one or more of various communications formats such as, for example, vehicle-to-everything (V2X), cellular V2X, dedicated short-range communications (DSRC), Wi-fi, Bluetooth®, Ultra-Wideband (UWB), Zigbee®, and/or Li-Fi (light-based communication).

The sensor system 425 can be provided in any of various forms such as, for example, an image capture system that includes one or more cameras, a radar detector, a sonar detector, and/or a LIDAR system. The sensor system 425 can provide information to the proximity alerting apparatus 115 in various forms such as, for example, an image, real-time video, a radar signal, and/or a sonar signal. The sensor system 425 can also provide data to the vehicle controller 110 of the vehicle 105 (when the vehicle 105 is an autonomous vehicle) that assists the vehicle controller 110 maneuver the vehicle 105 to avoid colliding with obstacles such as, for example, the bicycle 160.

The infotainment system 120 may include a display screen 429 that can display visual alerts/warnings to the driver 125 of the vehicle 105 (when the vehicle 105 is a driver-operated vehicle).

The vehicle controller 110 may control various operations of the vehicle 105 (fuel injection, speed control, braking, cruise control, etc.) either directly (when the vehicle 105 is an autonomous vehicle) or indirectly (by providing assistance to a driver of the vehicle 105 when the vehicle 105 is a driver-operated vehicle). The vehicle controller 110 may also communicate with the proximity alerting apparatus 115 to execute various actions in accordance with the disclosure such as, for example, to maneuver the vehicle 105 in order to prevent a collision with the bicycle 160.

The proximity alerting apparatus 115 can include a processor 435, a vehicle systems interface 440, and a memory 445. The memory 445, which is one example of a non-transitory computer-readable medium, may be used to store a database 455, an operating system (OS) 460, and code modules such as a proximity alerting code module 450. The code modules are provided in the form of computer-executable instructions that can be executed by the processor 435 for performing various operations in accordance with the disclosure. In an example implementation, the proximity alerting code module 450 may be loaded into, or downloaded into, the memory 445 in the form of a software application.

The vehicle system interface 440 may include hardware that allows the proximity alerting apparatus 115 to interact with various components of the vehicle 105, such as, for example, the communications system 415, the vehicle controller 110, and the infotainment system 120, and the sensor system 425, for executing various actions in accordance with the disclosure. Some of these actions can include receiving an alert signal via the communications system 415, instructing the infotainment system 120 to display a visual alert pertaining to the alert signal, instructing the vehicle controller 110 to perform a collision avoidance maneuver, and so on.

The proximity alerting code module 450 may be executed by the processor 435 for performing operations in accordance with the disclosure, such as, for example, the various operations described above. In an example scenario, a first type of alert signal (such as, for example, a message, a trigger signal, and/or a digital code) may be received by the wireless transceiver 416, from the proximity alerting apparatus 150 of the bicycle 160. The alert signal is communicated to the proximity alerting apparatus 115 via the vehicle systems interface 440.

The proximity alerting code module 450 can include an evaluation procedure to evaluate the alert signal. In an example implementation, the alert signal includes an instruction to the proximity alerting apparatus 115 to produce in the vehicle 105, a ringing sound of a bicycle bell to indicate that the personal transportation device is the bicycle 160. The processor 435 may act upon the instruction by fetching a first sound generation file from the database 455. The first sound generation file can be digital code executable by the processor 435 for generating a ringing sound of a bicycle bell. The processor 435 executes the first sound generation file by performing actions such as communicating with the infotainment system 120 (and/or the audio system 405) to produce the ringing sound through the speakers of the audio system 405.

In another example implementation, the alert signal may include an instruction to the proximity alerting apparatus 115 to produce in the vehicle 105, a sound that is tailored to indicate a presence of the motorcycle (in place of the bicycle 160). The processor 435 may act upon the instruction by fetching a second sound generation file from the database 455. The second sound generation file can be digital code executable for generating a beep of a motorcycle horn. The processor 435 executes the second sound generation file by performing actions such as communicating with the infotainment system 120 (and/or the audio system 405) to produce the sound of a motorcycle beep through the speakers of the audio system 405.

In yet another example, the alert signal may include an instruction to the proximity alerting apparatus 115 to display in the vehicle 105, a visual alert. The processor 435 may act upon the instruction by fetching an image generation file from the database 455. The image generation file can be digital code executable for generating an image upon the display screen 429 of the infotainment system 120. The processor 435 executes the image generation file by performing actions such as communicating with the infotainment system 120 to display an image upon the display screen 429 of the infotainment system 120. The display screen 429 can be a touch screen in an example implementation, and the image may be a graphic that includes icons such as, for example, of an icon depicting the vehicle 105, an icon depicting the bicycle 160, and an acknowledge icon. The driver 125 may touch the acknowledge icon to acknowledge receipt of the alert signal.

Figure 5:
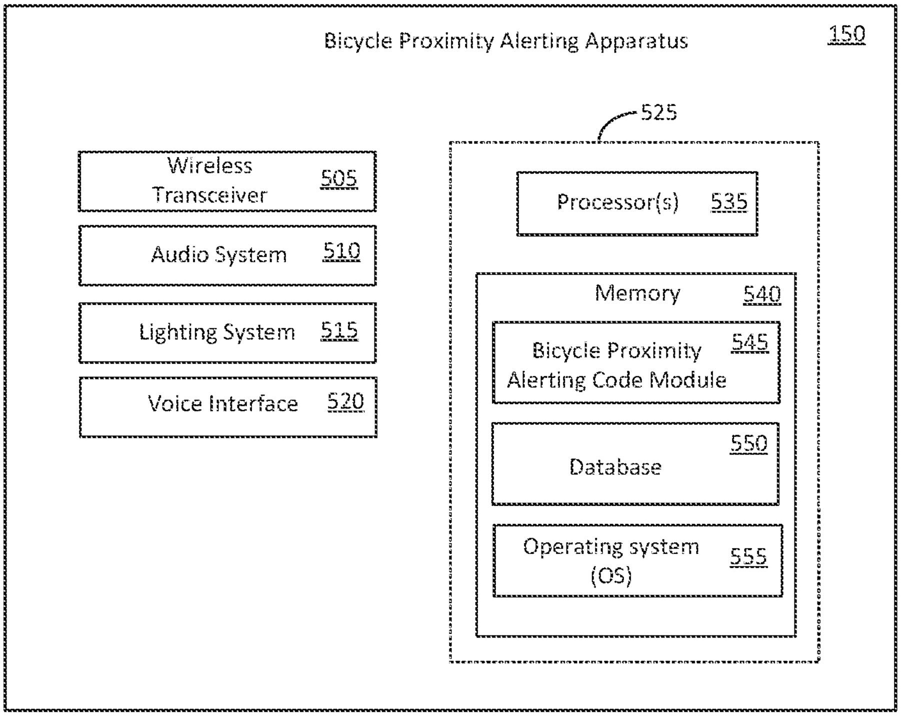
FIG. 5 shows some example components that may be included in a personal transportation device for implementing a proximity alerting system in accordance with an embodiment of the disclosure.

FIG. 5 shows some example components that may be included in the bicycle 160 for implementing the proximity alerting system 100 in accordance with an embodiment of the disclosure. The example components can include a wireless transceiver 505, an audio system 510, a lighting system 515, a voice interface 520, and a computer 525. Though shown as separate functional blocks, it must be understood that in some implementations, two or more functionalities may be performed by a single physical unit. Thus, for example, in an example implementation, the functionality of the computer 525 may be integrated into a physical unit that houses the wireless transceiver 505, the audio system 510, and the voice interface 520 as well.

The wireless transceiver 505 allows the proximity alerting apparatus 150 to transmit/receive information to/from the wireless transceiver 416 provided in the proximity alerting apparatus 115 of the vehicle 105. The communications may be carried out by using various communications formats such as, for example, vehicle-to-everything (V2X), cellular V2X, dedicated short-range communications (DSRC), Wi-fi, Bluetooth®, Ultra-Wideband (UWB), Zigbee®, and/or Li-Fi (light-based communication).

The audio system 510 can include a speaker and or a beeper for producing sound alerts and/or voice messages that can be heard by the rider 155. The sound alerts and/or voice messages may be produced, for example, when an acknowledgement signal is received from the wireless transceiver 416 of the vehicle in response to an alert signal transmitted from the wireless transceiver 505.

The lighting system 515 may provide signals under control of the computer 525 to operate various lights provided on the bicycle 160 such as, for example, a light provided on a housing containing the proximity alerting apparatus 150. The housing may be mounted upon a handlebar of the bicycle 160. The light provided on the housing may be activated, for example, upon receiving an acknowledgement signal from the proximity alerting apparatus 115 of the vehicle 105. The rider 155 may observe the light to recognize receiving of the acknowledgement.

The voice interface 520 may include, for example, voice recognition hardware and software configured to recognize voice commands issued by the rider 155. In an example scenario, the rider 155 may issue a voice command to transmit an alert signal to the vehicle 105. The rider 155 may issue the voice command when the bicycle 160 is within a threshold distance of the vehicle 105.

The computer 525 can include a processor 535 and a memory 540. The memory 540, which is another example of a non-transitory computer-readable medium, may be used to store a database 550, an operating system (OS) 555, and code modules such as a proximity alerting code module 545. The code modules are provided in the form of computer-executable instructions that can be executed by the processor 535 for performing various operations in accordance with the disclosure. In an example implementation, the proximity alerting code module 545 may be loaded into, or downloaded into, the memory 540 in the form of a software application. In an example embodiment, the computer 525 and some other components of the proximity alerting apparatus 150 such as, for example, the voice interface 520, may be included in a personal communications device (smartphone, tablet computer, etc.) of the rider 155.

In an example scenario, the processor 535 may execute the proximity alerting code module 545 to transmit a first type of alert signal to the vehicle 105. The first type of alert signal may include an instruction in the form of a message, a trigger signal, and/or a digital code. The message, trigger signal, and/or digital code may instruct the proximity alerting apparatus 115 of the vehicle 105 to produce in the vehicle 105, a ringing sound of a bicycle bell to indicate that the personal transportation device is the bicycle 160. The message, trigger signal, and/or digital code, which uniquely identifies the personal transportation device as a bicycle may be stored in the database 550 and fetched by the processor 535 when executing the proximity alerting code module 545.

In another case, where the personal transportation device is a motorcycle, for example, a different type of message, trigger signal, and/or digital code may be stored in a database that may be included in a proximity alerting apparatus of the motorcycle. This message, trigger signal, and/or digital code may uniquely identify the personal transportation device as a motorcycle in this case.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed by a processor, such as the processor 435 and the processor 535, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 445 and the memory 540, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

transmitting, by a first transceiver in a personal transportation device, an alert signal when the personal transportation device is within a threshold distance of a vehicle; and receiving, by the first transceiver, an acknowledgement signal transmitted by a second transceiver in the vehicle in response to the alert signal, wherein transmitting of the alert signal by the personal transportation device is initiated by a rider of the personal transportation device when the personal transportation device is within the threshold distance of the vehicle, and wherein the alert signal is initiated by a voice command of the rider, and further wherein the threshold distance is determined by the rider.

2. The method of claim 1, further comprising:

producing, by an audio system provided on the personal transportation device, an audio announcement to inform a rider of the personal transportation device that the alert signal has been acknowledged by the vehicle.

3. The method of claim 1, wherein the alert signal comprises an instruction to produce an audible alert and/or a visual alert to inform a driver of the vehicle that the alert signal has been received.

4. The method of claim 1, wherein the alert signal is automatically transmitted by the personal transportation device when the personal transportation device is within the threshold distance of the vehicle.

5. A system comprising:

a vehicle that includes a first transceiver, wherein the vehicle is an autonomous vehicle; and a vehicle controller that is communicatively coupled to the first transceiver, the vehicle controller comprising:

a memory that stores computer-executable instructions; and a processor configured to access the memory and execute the computer-executable instructions to perform operations comprising:

receiving an alert signal transmitted by a second transceiver provided on a personal transportation device;

transmitting to the second transceiver, an acknowledgement signal to acknowledge receipt of the alert signal; and producing a visual acknowledgement through a light mounted upon an exterior portion of the autonomous vehicle, to inform a rider of the personal transportation device that the alert signal has been received by the autonomous vehicle.

6. The system of claim 5, wherein the vehicle further includes an audio system, and wherein the processor is further configured to access the memory and execute the computer-executable instructions to perform operations comprising:

producing through the audio system, an audible alert to inform a driver of the vehicle that the alert signal has been received, the audible alert comprising one of a ringing sound of a bicycle bell or a beep of a motorcycle horn.

7. The system of claim 6, wherein producing the audible alert comprises the processor acting upon an instruction contained in the alert signal by executing a sound file stored in the memory.

8. The system of claim 5, wherein producing the visual acknowledgement comprises the processor executing a light flashing sequence stored in the memory.

* * * * *